Patented Aug. 15, 1950

2,518,440

UNITED STATES PATENT OFFICE

2,518,440

HYDROXYL-CONTAINING POLYMERS

Robert M. Joyce, Jr., Wilmington, Del., assignor to E. I. du Pont de Nemours & Company, Wilmington, Del., a corporation of Delaware No Drawing. Application August 9, 1948,
Serial No. 43,347

4 Claims. (Cl. 260—77.5)

This invention relates to new polymers and more particularly to a new class of hydroxyl-containing polymers.

Hydroxyl-containing polymers, such as cellulose and starch, are found abundantly in nature and are used extensively in the chemical industries. A number of synthetic hydroxyl-containing polymers, e. g., polyvinyl alcohol and hydrolyzed ethylene/vinyl acetate copolymers, have also been made. These synthetic products differ from the natural products, such as cellulose, in that the hydroxyl groups are secondary in character, whereas cellulose contains both primary and secondary hydroxyl groups.

This invention has as an object a new class of synthetic hydroxyl-containing polymers which contain both primary and secondary hydroxyl groups. A further object is a method for obtaining hydroxylated polymers of this kind. Other objects will appear hereinafter.

The new hydroxylated polymers of this invention contain a plurality of (1,2-dihydroxyethyl)-ethylene units, i. e., four-carbon glycol units of formula

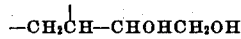
—CH₂CH—CHOHCH₂OH

They can be prepared by the hydrolysis of polymeric vinylethylene carbonate which consists of or contains in substantial amount structural units of formula

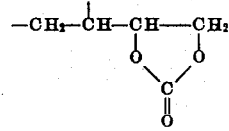

An efficient and preferred method for carrying out the hydrolysis involves heating a suspension of the polymeric carbonate in an aqueous solution of alkali at a temperature of from 50° to 110° C. From the standpoint of ease of separation of the resulting hydroxylated polymer from the by-products, the preferred alkali is barium hydroxide because this alkali is readily separated from solution as barium carbonate. The reaction may be presented by the following equation which shows the hydrolysis of the recurring structural unit in the polymeric vinylethylene carbonate to the corresponding recurring glycol unit in the resulting hydroxyl-containing polymer.

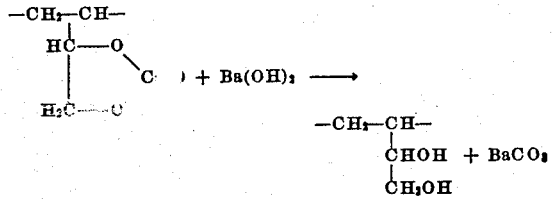

The two free valences in each instance represent the point of attachment of the unit to the rest of polymer chain.

The polymer containing the carbonate unit shown in the first member of the above equation can be either the vinylethylene carbonate homopolymer, i. e., polyvinylethylene carbonate, or the copolymer of vinylethylene carbonate with another polymerizable unsaturated organic compound, provided at least 10% of the structural units of the copolymer are derived from vinylethylene carbonate. In other words, the molar ratio of vinylethylene carbonate to other polymer-forming components in the copolymer is at least 10:90. The hydroxyl-containing polymer obtained consequently will be the vinylethylene glycol homopolymer, i. e., polyvinylethylene glycol, or a vinylethylene glycol polymer modified by the other polymerizable material introduced into the initial carbonate.

The invention is further illustrated by the following example in which parts are by weight.

A mixture of 2.3 parts of polyvinylethylene carbonate, 9.5 parts of barium hydroxide octahydrate and 25 parts of water was heated at 100° C. As hydrolysis proceeded, the hydrolyzed polymer passed into solution and barium carbonate separated from solution. After four hours heating at 100° C. the reaction mixture was cooled and carbon dioxide was bubbled through the mixture to precipitate the remaining barium hydroxide. The mixture was then filtered which gave as a residue 5.9 parts of barium carbonate. The water was removed from the aqueous filtrate under reduced pressure leaving polyvinylethylene glycol as a residue. The polymer was in the form of a white powder which melted at 112° C.

Analysis calculated for polyvinylethylene glycol ($C_4H_8O_2$): C, 54.53; H, 9.15. Found: C, 54.09; H, 9.31.

The polymeric glycol was formed into a self-supporting film by pressing it in a mold at 120° C.

The polyvinylethylene glycol obtained in accordance with the above example may also be referred to as polymeric-3-butene-1,2-diol. The reaction involved may be represented generally by

$(C_5H_6O_3)_x + xH_2O \longrightarrow (C_4H_8O_2)_x + xCO_2$

This polymer is essentially insoluble in benzene, ethyl acetate, acetone and cold methanol. It is hygroscopic and moderately soluble in water; thus at ordinary temperatures, one part of the polymeric glycol can be dissolved in three or four parts of water. The alcoholic character of these hydroxyl-containing polymers is apparent from the fact that they give a red color with ceric nitrate reagent (Identification of Organic Compounds, by Shriner and Fuson, ed. II, p. 52). The molecular weight of the polyvinylethylene glycol can be varied over a wide range depending upon the molecular weight of the polymeric carbonate from which it is prepared; which, in turn, is dependent upon the process of polymerization. In general, however, the molecular weight of the polymeric glycol will vary from about 1000 to 10,000.

In the foregoing example the hydrolysis was continued to completion. The present invention also includes hydroxyl-containing polymers obtained by interrupting the hydrolysis of the polymeric carbonate at an intermediate stage. When this is done the product is a polyester-polyalcohol, i. e., a polymer containing both carbonate and hydroxyl groups. In order to obtain a significant change in properties from the initial vinylethylene carbonate polymer, at least 10% of the carbonate groups in the initial polymer should be hydrolyzed. When the vinylethylene glycol polymers are obtained by hydrolyzing copolymers of vinylethylene carbonate, the hydrolysis should be continued until at least 10% of the units (each representing a molecule of monomer) in the resulting polymer contain hydroxyl groups. This means that if the copolymer contains vinylethylene carbonate and ethylene in a 1:1 molar ratio, at least 20% of the carbonate units should be hydrolyzed. The copolymerizable materials are preferably such ethylenically unsaturated compounds as ethylene, isobutylene, styrene, vinyl chloride, vinyl fluoride, vinyl acetate, acrylonitrile, methyl methacrylate, butadiene, or 2-chlorobutadiene-1,3. In the case of copolymers with olefins, only the vinylethylene carbonate units in the polymer are susceptible to hydrolysis; on the other hand, in the case of the copolymer with vinyl acetate, both the acetate and carbonate groups are subject to hydrolysis with the result that the product is, in effect, a copolymer of vinylethylene glycol and vinyl alcohol.

The polyvinylethylene carbonate used in making the hydroxy-containing polymers described herein can be prepared as described in the application of W. W. Prichard, Serial No. 24,922, filed May 3, 1948, now U. S. Patent 2,511,942, by first forming monomeric vinylethylene carbonate through the reaction of carbon dioxide with butadiene monoxide under pressures of from 30 to 3000 atmospheres or higher at temperatures of from 175° to 225° C. in contact with potassium hydroxide, and then polymerizing the monomeric carbonate alone, or in admixture with another polymerizable unsaturated compound, at temperatures of from 50° to 150° C. in contact with benzoyl peroxide or other suitable polymerization catalyst.

The hydrolysis process used in preparing the hydroxyl-containing polymers can be effected in aqueous medium or in the presence of an organic diluent, e. g., methanol or butanol. In place of barium hydroxide, other alkalies, e. g., sodium hydroxide, potassium hydroxide and lithium hydroxide, can be used to effect hydrolysis. Acids, such as hydrochloric and sulfuric, can be used but are less preferred. Hydrolysis can also be effected by heating the polymeric carbonate in water above about 140° C. under superatmospheric pressure.

The vinylethylene glycol polymers of this invention are solids at ordinary temperatures and are valuable in the manufacture of coating, molding, and adhesive compositions, and are useful in making films and filaments. In these various uses the polymers can be admixed with other resins, pigments, dyes, platicizer, etc. In view of the fact that these polymers contain alcoholic hydroxyl groups, they can be modified by treatment with materials reactive to hydroxyl group, for example, acids, anhydrides, aldehydes, and isocyanates. Thus, treatment of polyvinylethylene glycol with acetic acid or anhydride yields a polymeric acetate and treatment with formaldehyde yields a polymeric formal. Use of bifunctional reactants, e. g., adipic acid or hexamethylene diisocyanate, leads to cross-linking of the polymer with resultant isolubilization.

As many apparently widely different embodiments of this invention may be made without departing from the spirit and scope thereof, it is to be understood that I do not limit myself to the specific embodiments thereof except as defined in the appended claims.

I claim:

1. Polymeric material containing a plurality of four-carbon glycol units of the formula

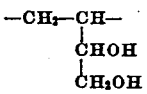

2. Polymer material containing a plurality of glycol units of the formula

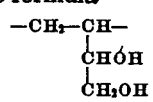

and a plurality of carbonate units of the formula

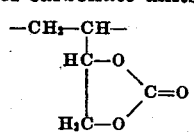

3. Polyvinylethylene glycol.

4. A process for obtaining a vinylethylene glycol polymer which comprises hydrolyzing a vinylethylene carbonate polymer containing a plurality of units of the formula

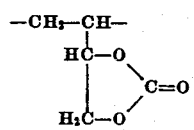

ROBERT M. JOYCE, Jr.

No references cited.

Certificate of Correction

Patent No. 2,518,440 August 15, 1950

ROBERT M. JOYCE, Jr.

It is hereby certified that error appears in the printed specification of the above numbered patent requiring correction as follows:

Column 3, line 29, for "acryonitrile" read *acrylonitrile*; line 40, for "hydroxy-containing" read *hydroxyl-containing*; column 4, line 11, for "plasticizer" read *plasticizers*; line 22, for "isolubilization" read *insolubilization*; line 36, for "Polymer" read *Polymeric*;

and that the said Letters Patent should be read as corrected above, so that the same may conform to the record of the case in the Patent Office.

Signed and sealed this 14th day of November, A. D. 1950.

[SEAL]

THOMAS F. MURPHY,
*Assistant Commissioner of Patents.*